C. B. KING.
PUMP.
APPLICATION FILED DEC. 16, 1916.

1,313,700. Patented Aug. 19, 1919.
4 SHEETS—SHEET 1.

INVENTOR
Charles B. King
BY Raizemond A. Parker
ATTORNEY

C. B. KING.
PUMP.
APPLICATION FILED DEC. 16, 1916.

1,313,700.

Patented Aug. 19, 1919.
4 SHEETS—SHEET 2.

INVENTOR
Charles B. King
BY Ratzemoird A. Parker
ATTORNEY

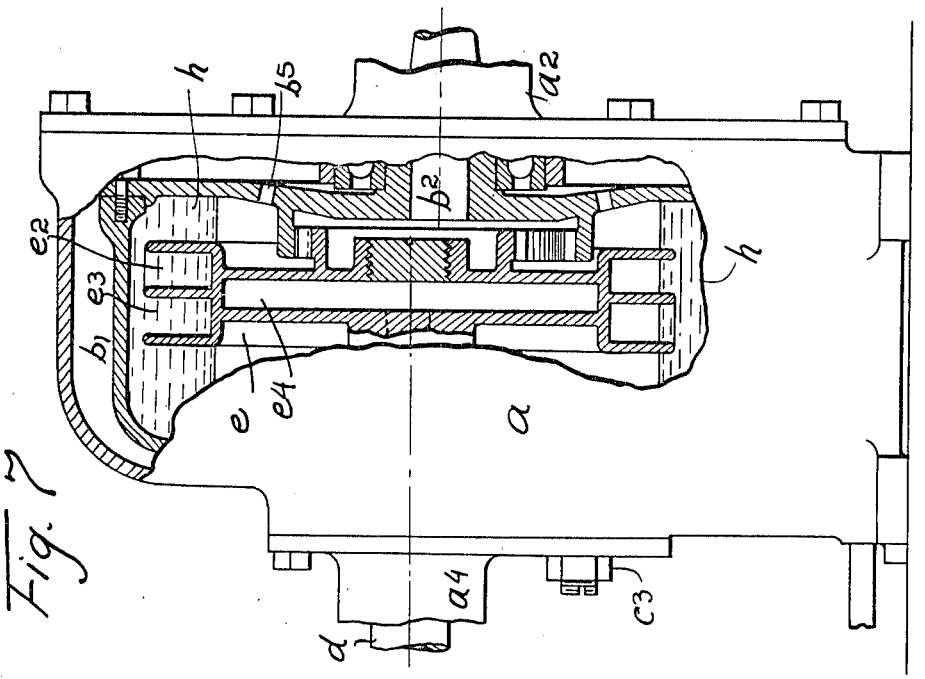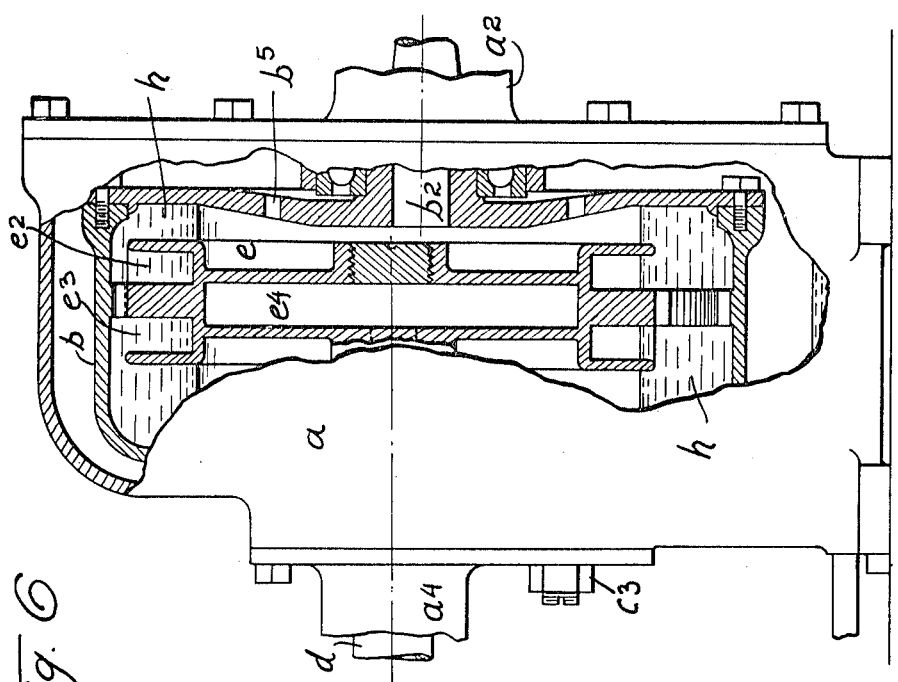

UNITED STATES PATENT OFFICE.

CHARLES B. KING, OF DETROIT, MICHIGAN.

PUMP.

1,313,700. Specification of Letters Patent. Patented Aug. 19, 1919.

Application filed December 16, 1916. Serial No. 137,280.

*To all whom it may concern:*

Be it known that I, CHARLES B. KING, a citizen of the United States, residing at Detroit, county of Wayne, State of Michigan, have invented a certain new and useful Improvement in Pumps, and declare the following to be a full, clear, and exact description of the same, such as will enable others skilled in the art to which it pertains to make and use the same, reference being had to the accompanying drawings, which form a part of this specification.

My invention relates to air vacuum and gas pumps and an object of my improvements is to provide an improved form of positively operating rotary pump.

I secure this object in the device illustrated in the accompanying drawings in which:

Figs. 6 and 7 are detail views showing alternative constructions.

$a$ is an inclosed casing having laterally extending cylindrical parts $a^2$ $a^4$, an eduction pipe $a^3$ for gas and a drain pipe $a^5$ for water. There is a chamber $a^7$ in the cylindrical projection $a^4$ with which communicates an induction pipe $a^6$ for gas.

$b$ is a cylindrical casing having a shaft or arbor $b^2$ resting in bearings $b^3$ and $b^4$ in the cylindrical projection $a^2$ from the casing $a$. $b^5$ $b^5$ are apertures through a side wall of the cylinder $b$ located radially at some distance from the periphery of said wall. The opposite side wall of the cylinder $b$ is cut away at its center as indicated at $b^6$ $b^6$ so as to surround the inner bearing for the shaft $d$ hereinafter described.

$d$ is a shaft resting in a ball-bearing $d^4$ at its inner end, extending laterally from the casing $a$ and adapted to turn in a bearing at its outer end where it is provided with a stuffing box as shown. $d^2$ is an opening extending into the shaft $d$ from its inner end, its walls being coaxial with said shaft. $d^3$ is an opening forming a communication between the chamber $a^7$ and the opening $d^2$ at the inner end of the same.

$e$ is a disk secured upon the inner end of the shaft $d$ within the cylindrical casing $b$. This disk is provided with two peripheral grooves $e^2$ and $e^3$ and with a central chamber $e^4$.

Each of the grooves $e^2$ and $e^3$ is provided with partitions and passages which are duplicates of each other but are arranged at different angular positions. Therefore the partitions and passages pertaining to one of said grooves only will be described.

The groove $e^3$ is provided in this instance with three radially extending transverse partitions $j$ $j^2$ $j^3$ dividing said grooves into three compartments.

Figure 3:
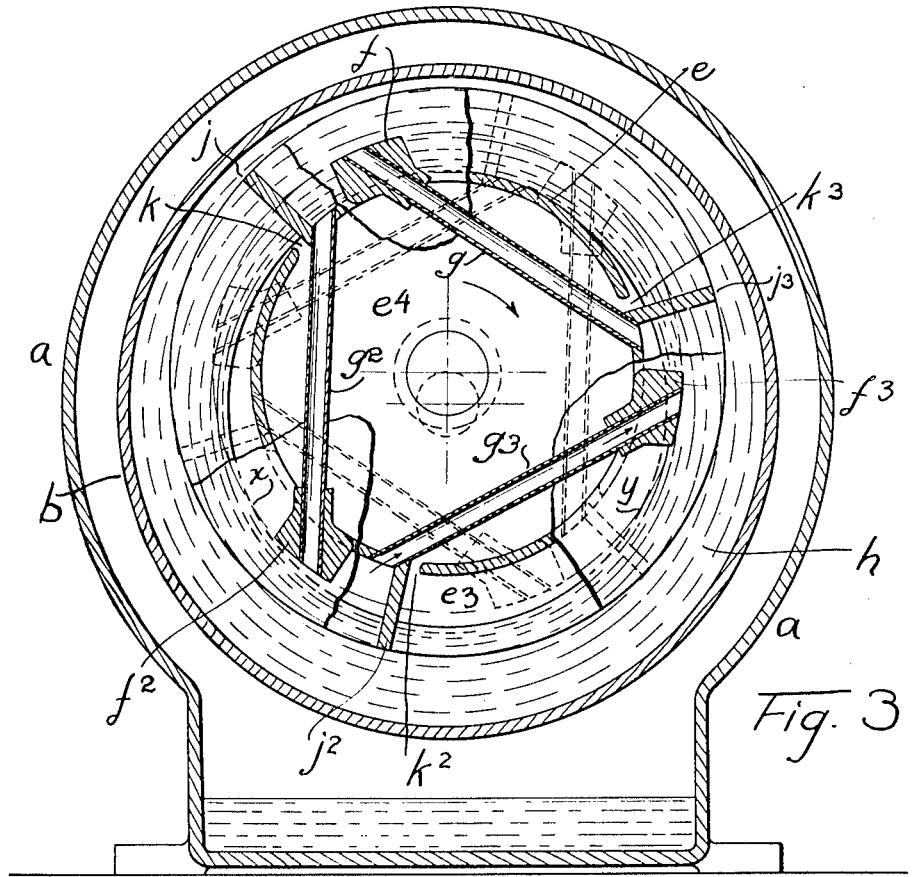
Fig. 3 is a section on the line C—C Fig. 1 with a partial section on the line $C^2$—$C^2$ Fig. 1 superimposed.
Figure 4:
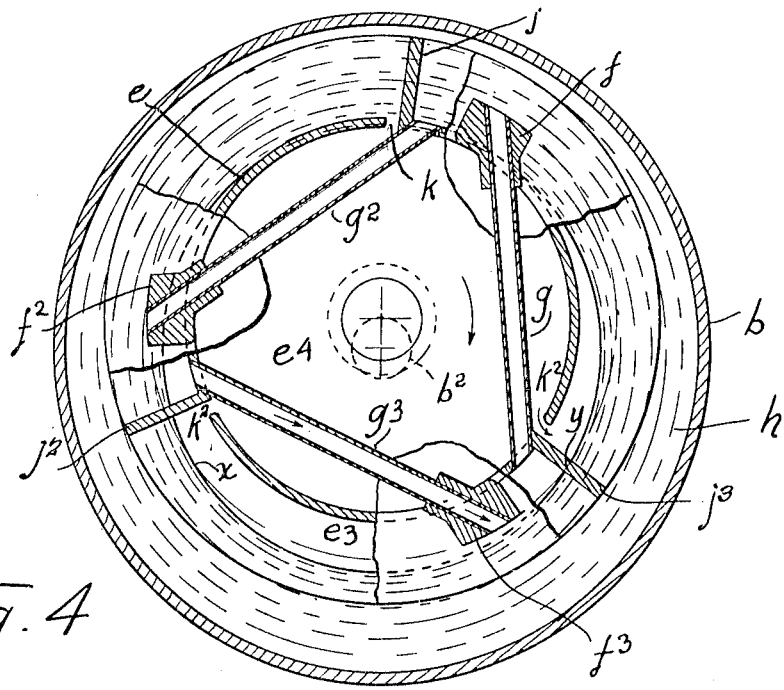
Figs. 4 and 5 are views similar to Fig. 3 showing the parts in different positions.
Figure 5:
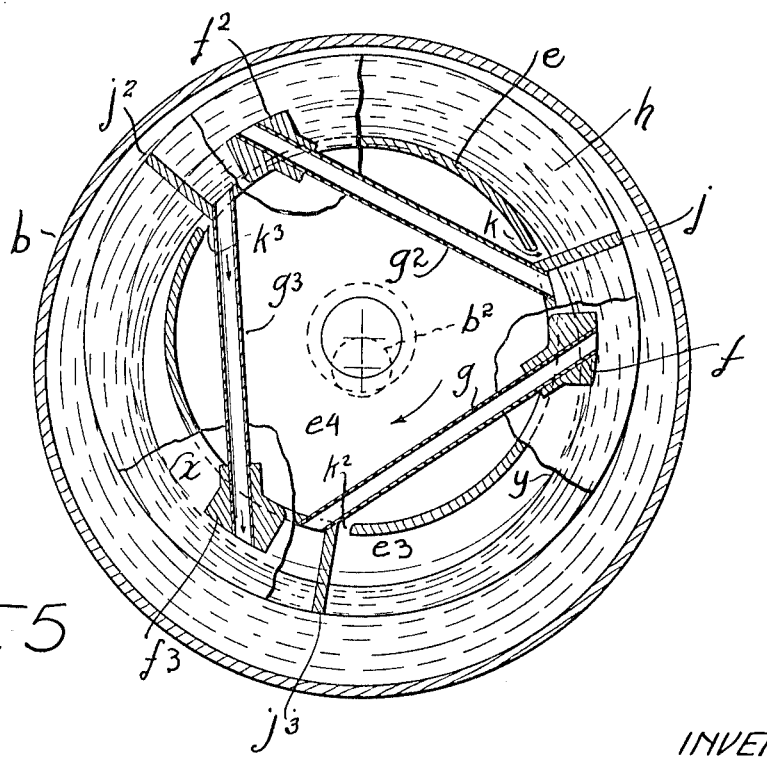

It will be understood for convenience of description that the disk $e$ is rotated in the direction of the hands of a watch as seen in Figs. 3, 4 and 5.

$k$ $k^2$ $k^3$ are apertures formed through the bottom of the groove $e^3$ and forming a communication with the chamber $e^4$ directly adjacent to each of the partitions $j$ $j^2$ $j^3$ upon the following side of said partitions.

$f$ $f^2$ $f^3$ are lugs extending laterally from the outer wall of the disk $e$ and so located that a straight tube $g$ $g^2$ or $g^3$ may open at the outer end of each of said lugs. Each of said tubes extends forward and opens into the groove $e^3$ through the bottom of said groove directly adjacent to the leading face of an adjacent partition $j$ $j^2$ or $j^3$ at approximately 120 degrees from the point at which it opens through the face of said lug.

I do not limit myself to the 120 degrees spacing but under certain changes in proportions I am able to vary this to increase and decrease the number of impulses per revolution by having a greater or less number of partitions and lugs.

Thus in this case each of the compartments into which the partitions $j$ $j^2$ $j^3$ divide the groove $e^3$ extends for approximately 120 degrees along the periphery of the disk $e$ and the leading end of each of said compartments opens through a passage or aperture $k$ $k^2$ $k^3$ into the chamber $e^4$ and the following end opens to a tube $g$ $g^2$ $g^3$ which opens at its other end at a point approximately 120 degrees from said chamber to the outside of the disk $e$ and the interior of the casing $b$.

$h$ indicates a liquid which may be water, mercury or other suitable liquid which is placed in the cylindrical casing $b$ and may overflow into the casing $a$ and be withdrawn through the drain pipe $a^5$.

For convenience I have indicated this liquid as water.

The shaft $d$ is rapidly rotated as by an electric motor or other convenient power. The action of the disk $e$ upon the water $h$ throws the latter to the periphery of the cylinder $b$ as indicated in the drawings. The casing $b$ also rotates thus obviating the friction and loss of power due to the relative motion of the water $h$ and its containing casing $b$.

$c$ (Figs. 1 and 2) is an angularly adjustable conduit opening at one end downward into the interior of the casing $a$ extending through the aperture $b^6$ $b^6$ into the interior of the casing $b$ and provided with a scoop $c^2$ (Fig. 2) extending at right angles to its axis within the casing $b$ and adapted to limit the inward extent of the body of water $h$. $c^4$ is a lug adapted to strike against a stationary part to limit the outward movement of the scoop $c^2$. $c^3$ is a nut by which the conduit $c$ can be fixed in any desired angular position. When the inner surface of the water reaches the scoop $c^2$ the water flows through the conduit $c$ into the casing $a$ and is withdrawn through the drain $a^5$.

The operation of the above described device is as follows:

The spindle $d$ is rapidly rotated carrying the disk $e$ with it and causing the water $h$ to be rotated and forced to the periphery of the cylindrical casing $b$. Said casing is also rotated which may be done automatically by the action of the water thereon until the angular velocity of the casing $b$, the disk $e$ and the water $h$ is approximately the same. The disk $e$ may be mechanically connected to the casing $b$ in any well known way as by gearing as shown in Figs. 6 and 7.

Figure 1:
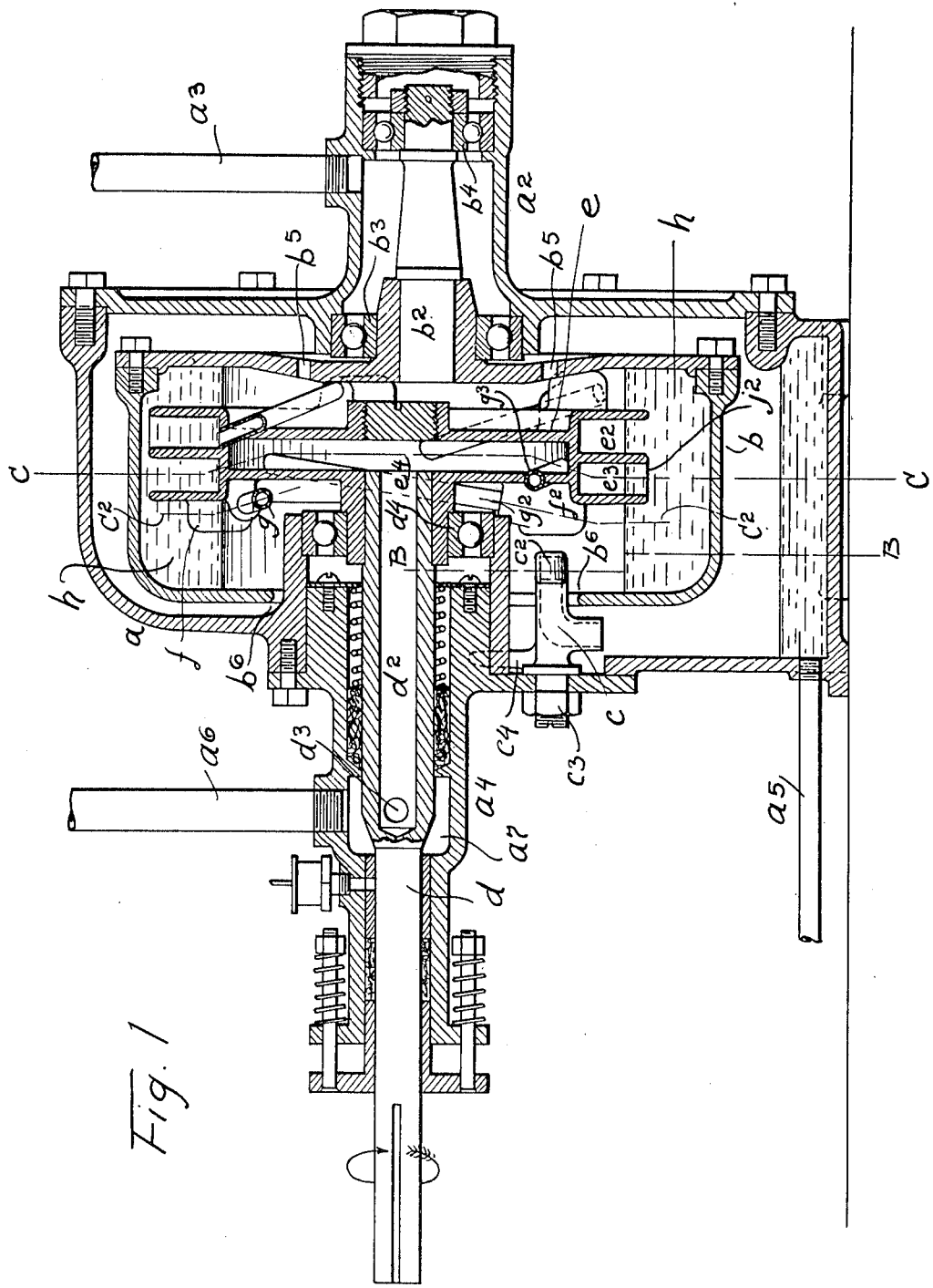
Figure 1 is a longitudinal section of an apparatus embodying my invention.

The disk $e$ it will be noticed is eccentric to the casing $b$ and therefore said disk approaches the inner peripheral wall of said casing upon one side as for instance the top, as shown in Fig. 1 and recedes from the same toward the other side as indicated in said figure.

As the disk $e$ rotates the water enters and fills the compartments in the groove $e^3$ at the top of said disk and is withdrawn from the same at the bottom of the disk, as shown for instance in Figs. 3, 4 and 5.

Turning to Figs. 3, 4 and 5 and observing the successive positions shown in said figures of the compartment of the groove $e^3$ between the partitions $j$ and $j^2$. In the position shown in Fig. 3 the passage or aperture $k$ is just coming into position to be sealed by the water and compression will commence in said chamber upon the sealing of said passage. The outer end of the tube $g^3$ is sealed by the water and therefore compression will commence in the chamber between the partitions $j$ and $j^2$. In the position shown in Fig. 4 the passage $k$ is sealed by the water, but the outer end of the tube $g^3$ is unsealed and as the air space is contracted in the compartment between the partitions $j$ and $j^2$ the air is discharged through said tube in the casing $b$ and thence escapes through the aperture $b^6$ into the casing $a$ and is discharged through the pipe $a^3$.

The air discharged from the groove $e^2$ passes through the apertures $b^5$ into the casing $a$.

Figure 2:
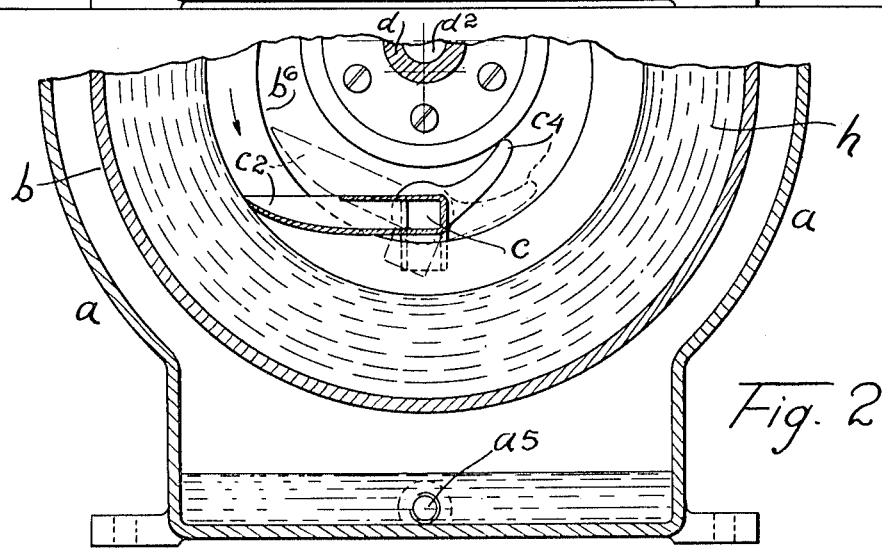
Fig. 2 is a section on the line B—B Fig. 1, looking from the right of said line.

In the position shown in Fig. 5 the passage $k$ is just emerging from the sealing liquid and the air cavity is being enlarged in the compartment so that air is sucked in from the chamber $e^4$ which is supplied through the induction pipe $a^6$ and passages $d^2$ and $d^3$ (Fig. 2).

Each of the compartments of the groove $e^3$ and also each of the compartments of groove $e^2$ passes continuously through the above described phases, and thus the apparatus is continually sucking the air from the chamber $e^4$ and discharging it into the air space of the rotating cylinder $b$ and thence into the casing $a$ and thence out from the induction pipe $a^3$. The sealing points are marked $x$ and $y$ on the dotted circle indicating the path of the outer surfaces of the lugs $f$ $f^2$ $f^3$.

Inasmuch as compression is continually taking place at the upper part of the casing $b$ the water level here will be forced inward making a more positive seal at the surface of the liquid.

To withdraw the heat from the air water may be sprayed into the incoming air and will be separated from it by centrifugal force and discharged through the drain $a^5$.

It will be noted that the induction ports $k$ $k^2$ $k^3$ are located nearer the center than the discharge ends of the tubes $g$ $g^2$ and $g^3$. The relative location of these orifices both angularly and radially is such that when the induction port commences to be sealed by the water annulus at the top, the corresponding discharge tube at its delivery end is just emerging from the water at the bottom of the casing $b$ and when an intake port is just emerging from the water at the top the delivery end of the corresponding discharge tube is just entering the water.

The disk $e$ extends below the surface of the annular body of water throughout its circumference and thus the outer opening from the grooves in said disk is continuously sealed.

What I claim is:

1. In an apparatus of the kind described, the combination of a revoluble part having a cavity therein opening at the periphery of said part, a revoluble casing inclosing said revoluble part and having its axis eccentric thereto, and adapted to hold an annular body of water at its outer wall, a body of water in said casing, said cavity being provided with an intake passage and a discharge passage, said passages being so arranged that the one passage shall be sealed by the water when the other passage is within the surface of the water.

2. In an apparatus of the kind described, the combination of a revoluble part having a cavity therein opening to the periphery of said part, an air intake passage within said part, a revoluble casing inclosing said revoluble part having its axis eccentric thereto and adapted to hold an annular body of water at its outer wall, a body of water within said casing, a passage opening through the wall of said cavity to said intake passage, a discharge passage from said cavity, said intake and discharge passages being so arranged that one of said passages shall be sealed by the body of water when the other of said passages is within the surface of said body of water.

3. In an apparatus of the kind described, the combination of a revoluble disk having a peripheral groove therein, said groove being divided into compartments by radial partitions, a gas intake passage opening to the leading end of each of said compartments through the bottom of the groove and an eduction passage opening into said compartments in the following end of said compartment and opening to the outside of said disk at a point angularly spaced backward from said groove, a rotatable casing inclosing said disk and adapted to retain a body of water at its outer wall, said disk and casing being so relatively arranged that the disk shall dip into said water deeper upon one side than upon the other.

4. In an apparatus of the kind described, the combination of a revoluble disk having a peripheral groove therein, said groove being divided into compartments by radial partitions, a gas intake passage opening to the leading end of each of said compartments through the bottom of the groove and an eduction passage opening into said compartments in the following end of said compartment and opening to the outside of said disk at a point angularly spaced backward from said groove, a rotatable casing inclosing said disk and adapted to retain a body of water at its outer wall, said disk and casing being so relatively arranged that the disk shall dip into said water deeper upon one side than upon the other, a stationary casing inclosing said rotatable casing, and an eduction passage leading from said stationary casing, said revoluble casing being provided with gas passages opening to said stationary casing.

5. In an apparatus of the kind described, the combination of a revoluble part having a cavity therein opening at the periphery of said part, a revoluble casing inclosing said revoluble part having its axis eccentric thereto and adapted to hold an annular body of water at its outer wall, a body of water in said casing, said cavity being provided with an intake passage and a discharge passage, the discharge passage being arranged at a greater distance from the center of the revoluble part than the intake passage so that one of said passages shall be sealed by the body of water when the other of said passages is within the surface of the body of water.

6. In an apparatus of the kind described, the combination of a revoluble disk having a peripheral groove therein, said groove being divided into compartments by radial partitions, a gas intake passage opening to the leading end of each of said compartments through the bottom of the groove and an eduction passage opening into said compartment in the following end of said compartment, and opening to the outside of said disk at a point farther from the center of the same than the intake passage and spaced backward from said intake passage, a rotatable casing inclosing said disk adapted to retain a body of water in annular form at its outer wall, a body of water in said casing, said disk having an axis eccentric to the axis of said casing for the purpose described.

7. In an apparatus of the kind described, the combination of a revoluble part having a cavity therein opening at the periphery of said part, a revoluble annular body of water surrounding said revoluble part and having its axis eccentric thereto, said cavity being provided with an intake passage and a discharge passage, said passages being so arranged that the one passage shall be sealed by the water when the other passage is within the surface of the water and means for containing said body of water.

In testimony whereof I sign this specification.

CHARLES B. KING.